P. ZÜRN.
MANUFACTURE OF RECEPTACLES FOR LIQUIDS AND GASES.
APPLICATION FILED DEC. 13, 1907.
907,552.  Patented Dec. 22, 1908.
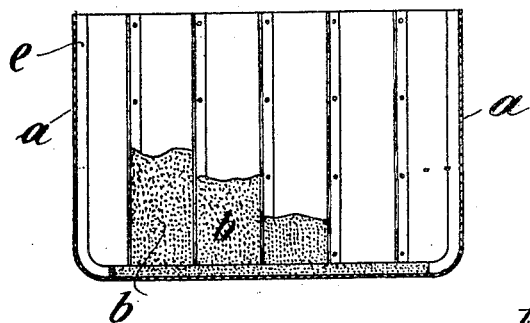
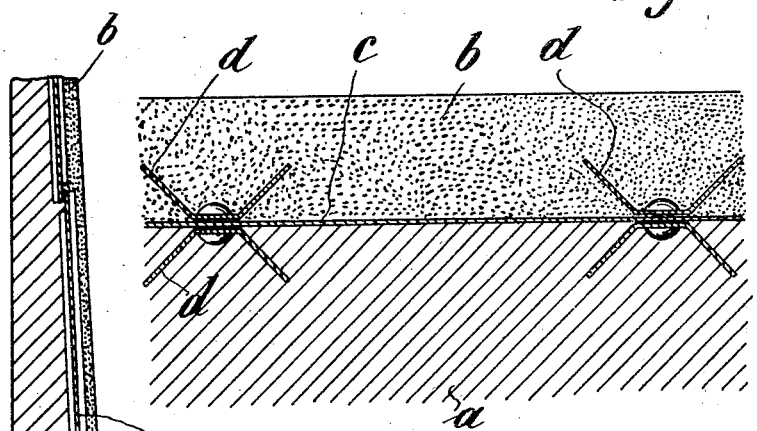
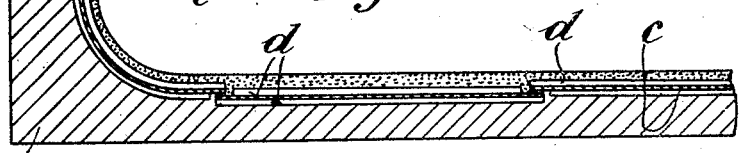
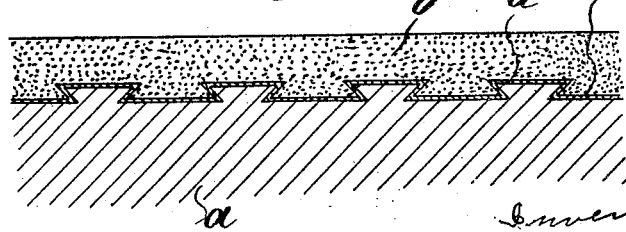

UNITED STATES PATENT OFFICE.

PAUL ZÜRN, OF CASSEL, GERMANY.

MANUFACTURE OF RECEPTACLES FOR LIQUIDS AND GASES.

No. 907,552.

Specification of Letters Patent.

Patented Dec. 22, 1908.

Application filed December 13, 1907. Serial No. 406,356.

*To all whom it may concern:*

Be it known that I, PAUL ZÜRN, architect, a subject of the German Emperor, and resident of 30 Kaiserplatz, Cassel, Germany, have invented certain new and useful Improvements in the Manufacture of Receptacles for Liquids and Gases, of which the following is a specification.

This invention relates to improvements in the manufacture of receptacles for liquids and gases.

In the manufacture of receptacles for liquids and gases a matter of primary importance, is of course, in most cases that the walls of the vessel should be perfectly liquid-tight or gas-tight. In the case of receptacles made of wood or metal, or of wood and metal in conjunction, it is usual to coat the inner surface with varnish or paint to close the pores, joints or crevices. In the case of receptacles made of brick-work, iron-trussed cement or concrete, the inner surface is frequently coated with a dense layer of plaster which is impregnated with resin, paraffin, ceresin, or a mixture of these substances. All these methods have disadvantages which cause the vessel to become useless or at least to some extent leaky after a certain period of use.

If the receptacle is of wood the thin coating of varnish or paint does not expand and contract uniformly with the wood, when the latter expands or contracts under the influence of atmospheric conditions, so that the coating becomes cracked, more particularly at the joints in the wall, and finally peels off. If the receptacle is of metal the thin coating also fails to expand and contract uniformly with the metal when changes of temperature occur, so that the varnish or paint soon shows cracks and crevices. Moreover, the coating is very liable to become detached from the metal when the receptacle is struck with a hammer or the like.

If the receptacle is of cement or concrete, with a coating of plaster, a long period usually elapses before the receptacle is sufficiently dry to be impregnated. If it is impregnated before it is dry the impregnating layer usually does not bind well, and the moisture has a decomposing effect on the impregnating mass. In some cases artificial heat may be used to accelerate the drying of the vessel, but in most cases this is impracticable.

The purpose of the present invention is to obviate these disadvantages, and the invention primarily consists in applying to the walls of receptacles of any material coatings consisting of substances of such nature that they form tough, hard coatings and that they can be applied in the form of layers of considerable thickness.

The invention also provides that in the case of cement or concrete vessels the coating is applied in such a manner that the cement or concrete can dry normally and without affecting the coating.

According to the invention the coating is preferably of resin or pitch, to which may be added ozocerite, linseed oil, paraffin, stearin, ceresin or the like to increase its toughness, and sulfur or the like to increase its hardness and accelerate the setting. Substances other than those here named may, however, be used.

In order that the coating may be thick, and to increase its elasticity and cheapness, suitable admixtures may be used, for example ground cork, asbestos fiber, a mixture of cork and asbestos, or other similar substances.

The invention is illustrated in the annexed drawing by means of examples.

Figure 1 is a sectional view through a vessel in which my invention is embodied; Fig. 2 is a sectional view through a vessel wall in which the invention is embodied in a form slightly different from that shown in Fig. 1; Fig. 3 is a sectional view through a vessel embodying my invention and in which overlapping protective plates are employed; and, Fig. 4 is a sectional view through a modified form of the invention and showing the protective plates swaged to interlock with the wall and the coating.

If the vessel is of wood and metal, or wood in conjunction with metal, the mass to be used for the coating is melted and applied to the walls and bottom *a* in a hot, plastic state. To insure a durable connection between the mass and the wood or metal, and to strengthen or truss the coating itself, the wall and bottom may be formed with vertical ribs or flanges *e* between which the mass is applied, beginning at the bottom and working upwards, as shown in Fig. 1.

If the walls and bottom are of cement or concrete they are preferably covered with metal plates *c* before the coating is applied, as shown in Figs. 2, 3 and 4. The plates are preferably made to overlap each other at their edges, as shown in Fig. 3. These plates may have on both sides ribs or flanges $d$ (Fig. 2) projecting at suitable angles to engage the coating and the concrete respectively, the coating being applied to the metal plates and not to the concrete directly. The coating and concrete are thus enabled to dry independently from each other, and the coating cannot become detached since it is locked to the wall by means of the intermediate plates and ribs.

At the parts $f$ (Fig. 3) where the plates overlap each other, strips of tarred cardboard, fabric or the like may be interposed between the plates to make tight joints.

Fig. 4 illustrates a modification in which, instead of having ribs or flanges $d$, the plates $c$ are swaged dovetail fashion at $d^1$ to interlock with the wall $a$ and coating $b$ respectively.

Instead of the ribs $d$ other metal devices may be used for strengthening the coating and making a firm connection with the wall, for example strong metal net-work, clamps and the like.

The term receptacle used in connection with the present invention does not only include portable vessels in the ordinary sense, but also stationary structures such as cellars, tanks, basins and the like which are to contain liquid or the walls of which are to prevent the entrance of liquid, for example underground water.

What I claim as my invention and desire to secure by United States Letters Patent is:

1. A receptacle for liquid and gaseous substances, comprising an outer shell, an inner armor of iron provided with inwardly projecting portions, and an inner non-conducting coating within which said projecting portions are embedded.

2. A receptacle for liquid and gaseous substances, comprising an outer shell, an inner armor of iron made in overlapping sections and provided with inwardly-extending portions, said sections being suitably packed at the overlapping joints, and a non-conducting coating rigidly secured to said armor by means of said inwardly-extending portions.

The foregoing specification signed at Cassel this 29th day of November, 1907.

PAUL ZÜRN.

In presence of two witnesses—
LUDWIG GEISMUS,
MORITZ KRESS.